INVENTOR
CLAIRE N. BREWER

Scrivener Parker
Scrivener & Clarke
ATTORNEYS

INVENTOR

CLAIRE N. BREWER

BY

Scrivener Parker Scrivener & Clarke

ATTORNEYS

INVENTOR

CLAIRE N. BREWER

BY

Scrivener Parker Scrivener & Clarke

ATTORNEYS

Aug. 6, 1968 C. N. BREWER 3,395,860

APPARATUS FOR EFFECTING SEQUENTIAL OPERATION OF THE KEYS OF A TAPE PERFORATING MACHINE

Filed June 23, 1966 4 Sheets-Sheet 4

INVENTOR

CLAIRE N. BREWER

Scrivener Parker Scrivener & Clarke

ATTORNEYS

United States Patent Office 3,395,860
Patented Aug. 6, 1968

3,395,860
APPARATUS FOR EFFECTING SEQUENTIAL OPERATION OF THE KEYS OF A TAPE PERFORATING MACHINE

Claire N. Brewer, Indianapolis, Ind., assignor to International Typographical Union of North America, Colorado Springs, Colo.

Filed June 23, 1966, Ser. No. 559,769
1 Claim. (Cl. 234—15)

ABSTRACT OF THE DISCLOSURE

A machine for operating the keys of a tape perforating machine in any one of a number of pre-determined sequences to produce automatically the tape perforations for any of a number of different words or names. A solenoid is provided to operate each key of the tape perforating machine and the windings thereof are connected respectively to the leads of a first group which extend across a battery of circuit boards. A rotory switch is provided and the fixed contacts thereof are connected respectively to the leads of a second group which also extend across the battery of boards. A plurality of boards are included in the battery and each has contacts which engage all the leads of the two groups when the board is activated. Only certain contacts of each board are connected, the connections being such that upon activation of a board and operation of the rotary contact of the switch selected leads of the second group are connected in pre-determined sequence to selected leads of the first group in order to operate the key-operating solenoids in the sequence of the contacts of the rotary switch. An operating key is provided for each selected name or word and upon depression of any such key the rotary switch is operated and the corresponding board is moved to place its contacts in engagement with the leads of the two groups.

This invention relates broadly to the operation of the keyboards of machines which perforate tape which is used in the operation of typesetting or typecasting machines. While the invention is useful in the operation of the keyboards of such, and similar, machines, it will be particularly described in this application in connection with, and as applied to, a machine which perforates tape which is used in the operation and control of a typesetting or typecasting machine such as the machines now commercially under the trademark Linotype.

It has, for many years, been the general practice in the printing art to cast and set type by the use of machines such as the Linotype. Such machines are equipped with a special keyboard, usually having ninety keys, although sometimes a greater and sometimes a smaller number of keys are provided, and the operation of such machines must be performed by highly skilled personnel who are able to operate the special keyboard and perform other duties essential to the most efficient operation of these very complex machines.

It has heretofore been proposed to operate such typecasting machines by means of a perforated tape prepared on a machine having a keyboard which corresponds to the standard typewriter keyboard, with the addition of certain keys for performing operations and producing characters which are necessary in printing but not in typewriting. Such machines are now available commercially, a typical one being known as the Teletypesetter. It has been found, however, that the over-all efficiency and cost of typecasting with the use of such auxiliary tape-perforating machines are less favorable than the efficiency and cost of operation with the use of skilled Linotype operators who are particularly skilled in the operation of typecasting machines having the standard Linotype keyboard. The use of machines for perforating tape for the operation of typecasting machines has become widespread, however, and it has been learned that important advantages are produced in the over-all efficiency and costs of a printing plant by the operation of such machines by skilled operators having knowledge of the entire typecasting, typesetting and printing operations and, particularly, being skilled in the use of the standard Linotype keyboard.

In my United States Letters Patents Nos. 2,679,902, 2,737,240 and 2,737,616 and in United States Letters Patent to Happel, Arvin and Murphy, No. 2,739,649, there is disclosed apparatus, including a keyboard having keys positioned and arranged substantially as those of a standard Linotype machine keyboard, for association with a tape perforating machine such as the Teletypesetter, which apparatus, upon operation of its keys, actuates the keys of the tape perforating machine keyboard through solenoids associated with those keys, to perforate tape in the normal manner of operation of the tape perforating machine. The apparatus provided by these patented inventions will be referred to hereafter in this specification as the "auxiliary keyboard apparatus," and the tape perforating machine will sometimes be referred to as the "TTS."

The use of such perforated tape to operate typecasting machines has spread from the composition of newspapers, magazines and the like to such printed publications as telephone directories, in the preparation and printing of which low cost is essential. The preparation of perforated tape for a directory for a large telephone system requires a great number of separate hand operations, and in my United States Letters Patent No. 3,113,718, issued December 10, 1963, for Apparatus for Effecting Sequential Operation of the Keys of a Tape Perforating Machine, I have pointed out in detail that approximately fifty-one separate key operations are required to perforate the tape necessary to case the type for a single, normal line of a telephone directory listing.

In that Letters Patent I have described and claimed a system and means by which the labor required to perforate tape for a telephone directory is very greatly reduced by taking advantage of the fact that many last names of subscribers are repeated many times, there being, for example, in the 1963–1964 Washington, D.C., telephone directory 3800 listings of persons having the name "Brown," 4300 listings of "Johnson," 3500 listings of "Jones," and comparable numbers of listings of other frequent names. In the use of the system and means provided by my patented invention it is necessary only to operate a single key of the auxiliary keyboard in order to cause automatic sequential operation of all of the keys of the tape perforating machine which are required to be operated to produce the tape perforations to set the type for the letters of any desired name, such as Brown, Johnson, Jones and the like. This is accomplished by means of a selective rotary switch which, when actuated, sequentially closes the circuits of the operating solenoids of the auxiliary keyboard apparatus which are associated with the keys of the TTS keyboard which spell the selected name and perform other necessary operations such as shift and unshift.

While the automatic sequential operating system of the Letters Patent referred to is entirely successful in greatly reducing the time, and therefore the cost, involved in perforating tape for any repetitious text, it has been found that in changing the system from a set-up for one name, for example "Brown," to another such as "Jones" it is necessary to re-wire the operating circuits for the solenoids of the auxiliary keyboard apparatus in order to cause the new sequence of keys of the TTS to be operated. While this re-wiring may be simplified by the use of plugs and jacks, it is necessarily time consuming and requires that the perforating machine be shut down while it is being performed, with consequent loss of time and increase of cost.

It has accordingly been the principal object of this invention to provide new and improved means for effecting the automatic sequential operation of the keys of a tape perforating machine and, more particularly, for rapidly changing from a system set up to produce automatic sequential operation of the keys necessary to perforate tape for one name or word to a set-up for another name or word.

The means provided by the invention for effecting this are described in the following specification and are illustrated in the accompanying drawings, in which FIG. 1 is a circuit diagram illustrating the means provided by the invention for producing, in pre-determined sequence, the tape perforations for any desired number of combinations of letters, numerals or the like;

Figure 1:
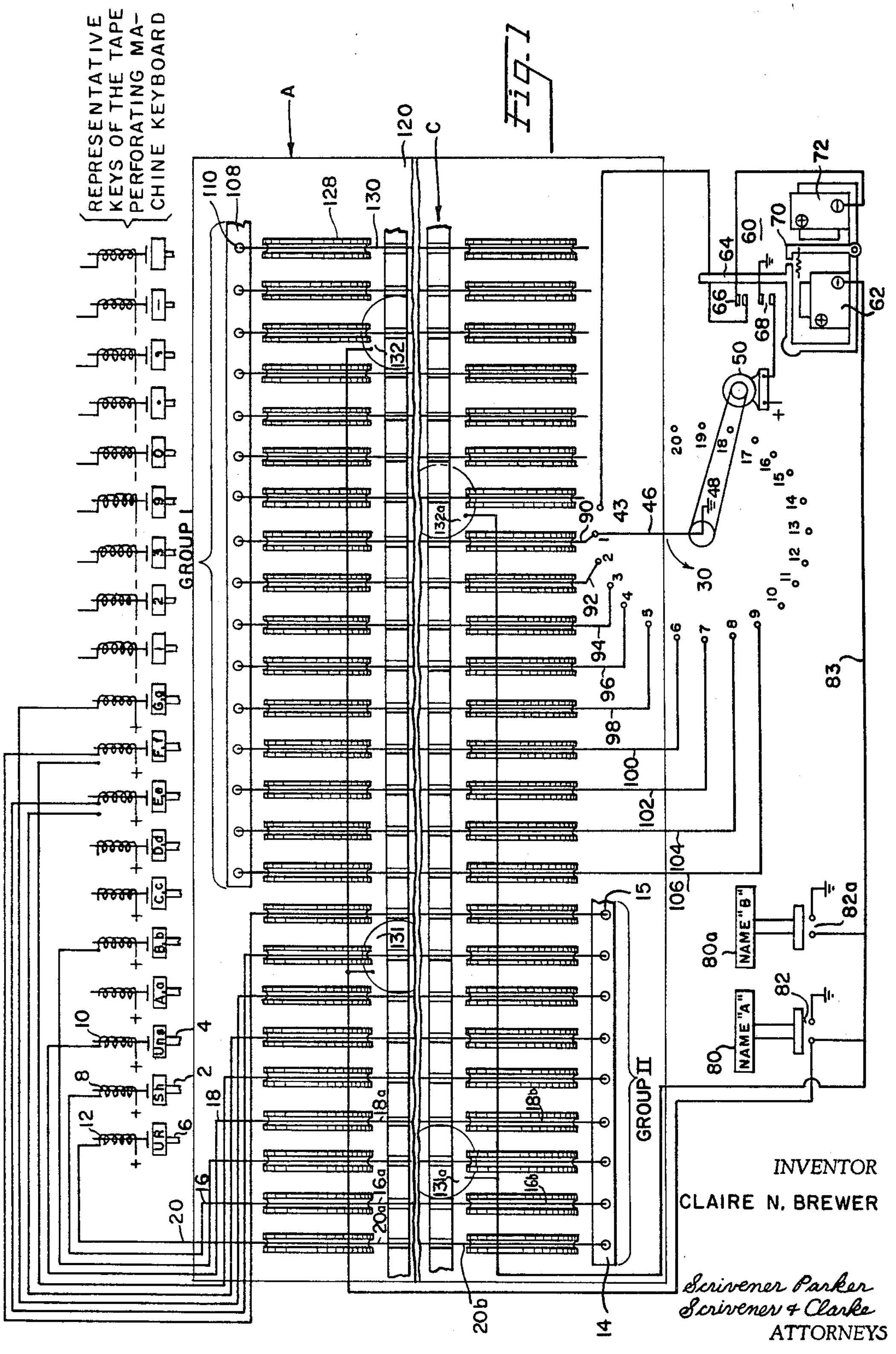

In FIG. 1 of the drawings forming part of this specification there are shown representative keys of the keyboard of a tape perforating machine such as the TTS. This keyboard has a key for each letter of the alphabet although, for purposes of simplicity, not all of these letter keys are shown in FIG. 1. The keyboard also has a key for each numeral from zero to nine, not all of which are shown in FIG. 1. In addition, the keyboard has a shift key 2 and an unshift key 4 which, when operated, produce characteristic tape perforations which cause the typecasting machine operated and controlled by the tape to set upper case or lower case characters corresponding to subsequent tape perfortions, depending on which of the shift and unshift keys was last previously operated. Thus, for example, operation of the "A" key will always produce the same characteristic tape perforation, but the typecasting machine controlled and operated by the tape will cast an upper case "A" or a lower case "a" depending on whether the shift or unshift key was last operated prior to operation of the "A" key. The keyboard also has an upper rail key 6 which, when operated, produces a characteristic tape perforation which causes the typecasting machine operated and controlled by the tape to set bold face upper or lower case characters corresponding to subsequent tape perforations. In addition, the keyboard has the following keys, none of which are shown in FIG. 1 for purposes of simplicity:

| | |
|---|---|
| Lower rail | En leader |
| Space | V-rule |
| Paper feed | $ |
| Lower magazine | : ; |
| QR | ( ) |
| QL | Hyphen (-) |
| QC | Comma |
| Em space | Period |
| En space | Bell |
| Thin space | Quotes (" ") |
| Em leader | |

In FIG. 1 of the drawings there are also shown parts of the auxiliary keyboard apparatus provided by the two Letters Patent first referred to above. Thus, there is associated with each key of the tape perforating machine a solenoid having a plunger which, when the solenoid is energized, depresses the key to produce the tape perforation characteristic of the letter, numeral or other symbol of the key. Thus, solenoids 8, 10 and 12 are associated with keys 2, 4 and 6, respectively, and have plungers which operate the associated TTS keys when the solenoid is energized. One terminal of the winding of each solenoid is connected to a source of electrical energy, as indicated.

For purposes of simplicity of the drawings, only representative keys of the tape perforating machine keyboard, with their associated operating solenoids, are shown in the drawings, but it will be understood that those which are shown are representative of all of the keys of the tape perforating machine and all of the operating solenoids for the keys.

Figure 2:
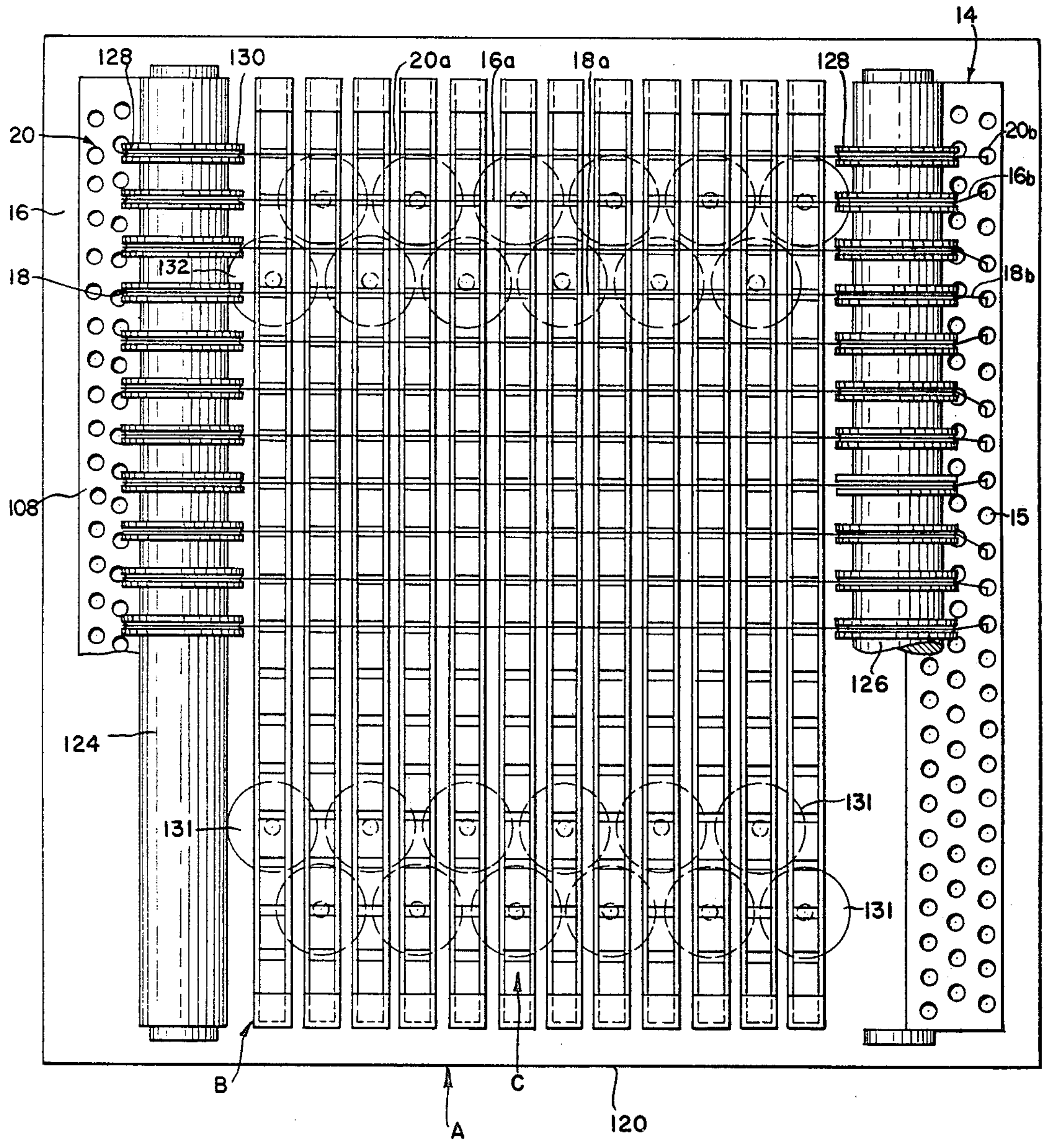
FIG. 2 is a top plan view of the circuit board battery which is shown in more diagrammatic form in FIG. 1.
Figure 3:
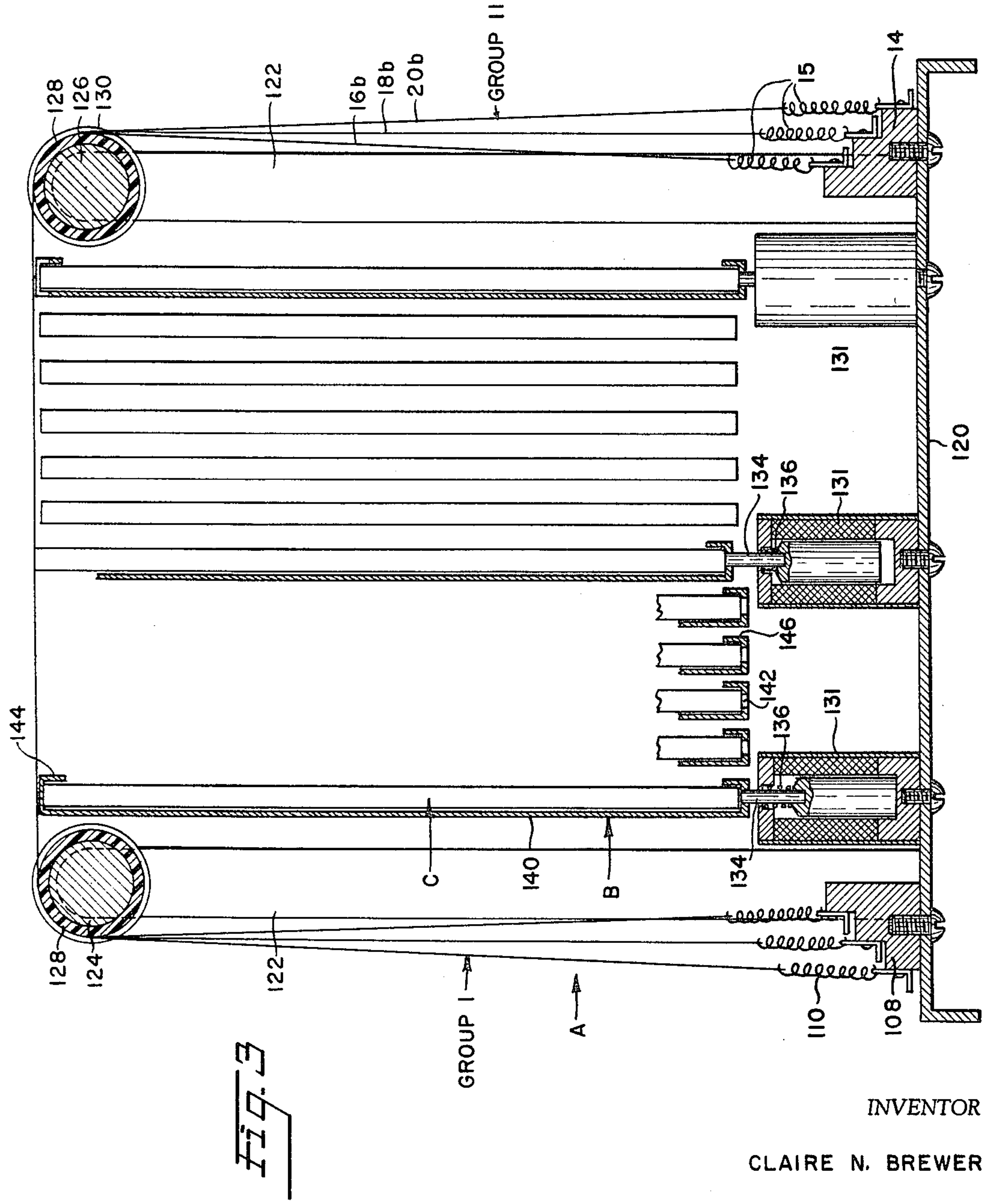
FIG. 3 is a side view of the circuit board battery.

The second terminal of the winding of such of the operating solenoids, such as solenoids 8, 10 and 12, has connected to it a lead which extends to a circuit board battery A, which is described fully hereinafter, and has a part extending over the battery and terminating in a permanent connection to a supporting member 14 which forms part of the battery at the lower part of one side thereof as shown in FIGS. 2 and 3, each such connection being made through an extension spring 15. Each solenoid winding has such a lead, and the parts of these leads extending over the circuit board battery are spaced apart as shown in FIGS. 1 and 2. Thus, leads 16, 18, 20 are connected, respectively, to the open terminals of solenoids 8, 10, 12 and, as shown in FIG. 1, each of these leads has a part designated with the additional letter *a* (16*a*, 18*a*, 20*a*) which extends horizontally across the upper part of the circuit board battery, and another part which extends downwardly, as shown at 16*b*, 18*b*, 20*b*, for connection to the fixed bar 14. These parts are shown in top plan view in FIGS. 1 and 2 and in side view in FIG. 3.

The keys 2, 4, 6 of the tape perforating machine, the operating solenoids 8, 10, 12 for the keys of the tape perforating machine, the leads 16, 18, 20 from the solenoids, the parts 16*a*, 18*a*, 20*a* of the leads which extend in spaced relation across the upper part of the circuit board frame, and the other described parts of the leads, the springs 15, and other parts are representative of all of the corresponding parts which form part of the apparatus provided by the invention.

In further accordance with the invention there is provided a selective rotary switch 30 comprising a plurality of fixed contacts arranged in a circular series, twenty contacts being shown in the illustrated embodiment of the invention and being designated as contacts 1 to 20, inclusive. The switch also comprises a contact arm 46 which is rotatably mounted and grounded at 48 and at its outer end engages successively the fixed contacts as the arm is rotated in a counter-clockwise direction by a motor 50, which may be a commercially available magnetic brake gear motor. There may be any number of fixed contacts in the switch, depending on the greatest number of keys of the tape perforating machine which it is desired to operate by means of the invention. It will be seen that as the contact arm moves in its normal rotation in a counter-clockwise direction it will pass from a normal, inoperative position in engagement with open fixed contact 43, and out of engagement with the first fixed contact 1, successively over the fixed contacts 1 to 20.

Means are provided by the invention for controlling the operation of motor 50, to thereby operate the movable contact arm 46. Such means comprise a latching relay, which is indicated generally at 60 and which comprises relay coil 62 which, when energized, operates pivoted armature 64 to close two normally open switches 66, 68. A pivoted latching arm 70 is constantly biased toward armature 64 by a spring and, when the armature is moved to operative position closing switch 66, 68 the latching arm holds the armature in this position until it is pulled away from the armature by energization of release coil 72. One terminal of motor 50 is connected to power and the other is connected to one contact of the normally open switch 68, the other contact of which is connected to ground. One terminal of the release coil is connected to power and the other is connected to one contact of the normally open switch 66, the other contact of which is connected to the open contact 43 of the series of fixed contacts of the selective rotary switch 30. A number of control devices **80, 80*a* are provided on the keyboard of the auxiliary apparatus, each of which is a special "name" key and each of which is arranged when depressed to close a normally open switch 82, 82*a*, one contact of which is grounded and the other contact of which is connected by lead 83 to the open terminal of relay coil 62**, for a purpose and with a result which will be described.

Each of the contacts 1 to 20 of the selective rotary switch 30 has permanently connected thereto a lead which extends to and across the upper part of the circuit board battery A which has heretofore been referred to and which is fully described hereinafter. Thus, contacts 1 to 9, inclusive, have leads 90 to 106 connected thereto, respectively, each of which extends across the upper part of the circuit board battery and downwardly to be connected to a fixed connecting bar 108 through an extension spring 110, as shown in FIGS. 1 and 3. It will be seen that th econnecting bars 14 and 108 are parallel to each other and are disposed on opposite sides of the circuit board battery. These leads, including the parts which extend across the circuit board battery, are spaced apart, as are the parts **16*a*, 18*a*, 20*a* of the leads 16, 18, 20** which have heretofore been described, all as shown in FIGS. 1 and 2.

Figure 4:
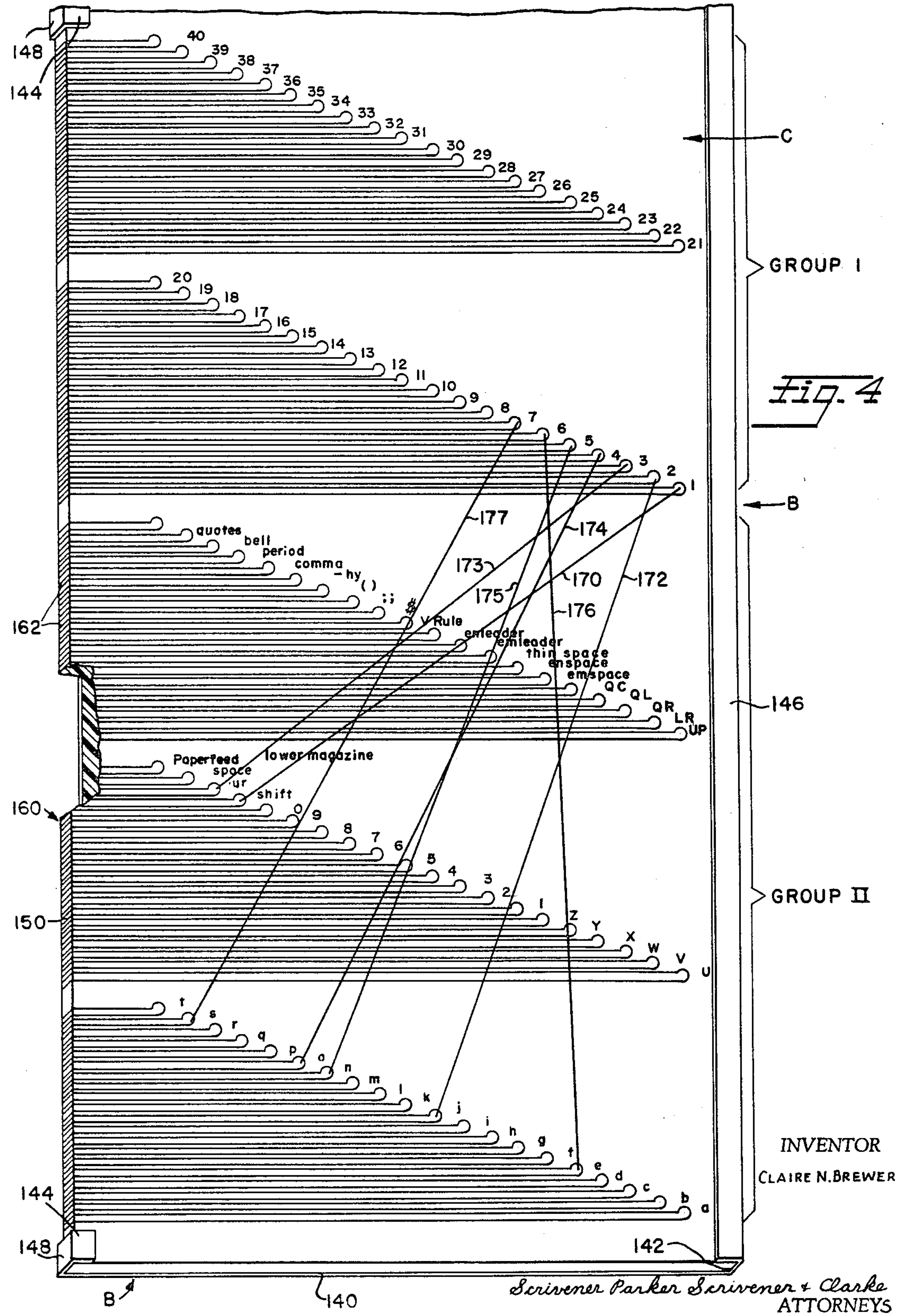
FIG. 4 is a perspective view of a circuit board within its supporting frame.

The circuit board battery A, the circuit board frames B and the circuit boards C will now be described in order to relate them to the electrical and other apparatus provided by the invention. The battery is illustrated in top plan view, with parts broken away, in FIGS. 1 and 2 and in side view in FIG. 3 and comprises a flat, rectangular base 120 having four upstanding members 122 at its corners which support at their upper ends two parallel, cylindrical members 124, 126 each of which is provided along its length with a plurality of spaced annular guide members 128 formed of electrically insulating material, each of which is provided with an external, circumferential groove 130. The guide members 128 on the two cylindrical members are aligned with each other transversely of the circuit board battery as shown in FIG. 2. The parallel connecting bar 14, 108 are permanently attached to the upper surface of the base 120 and are positioned beneath and parallel to the upper cylindrical members 124, 126. The outer surfaces of these bars are stepped as shown in FIG. 4 in order to accommodate better the large number of leads from the operating solenoids of the TTS, such as leads 16, 18, 20, and the leads from the rotary switch 30, such as leads 90 to 106 the one end of all of which are connected to one of the two bars through springs 15 or 110.

On the upper surface of the base 120 there are mounted a plurality of pairs of solenoids, those of each pair being designated 131, 132. Each of these solenoids is attached to the base in a vertical position so that its plunger 134, which is normally held in down position by a spring 136, is moved vertically upwardly against the force of the spring when the winding of the solenoid is energized. The solenoids of each pair are positioned adjacent opposite ends of the base and are aligned in parallelism to the upper cylindrical members 124, 126. At each end of the base the solenoids of adjacent pairs are offset with respect to each other so that their centers are closer together, making it possible to accommodate a maximum number of pairs of solenoids on the base. Thus, in the example shown in FIG. 2 twelve pairs of solenoids are shown but it will be understood that there may be a greater or lesser number depending on the number of circuit boards to be accommodated by the battery.

Connected to, and supported by, the upper ends of the armatures of the solenoids of each pair is a circuit board frame B. As particularly shown in perspective in FIG. 4, each of these frames is substantially C-shaped in cross section, having a vertical back member 140, bottom member 142 and upper and lower front members 144, 146. The upper part of each frame is cut away between the ends of the frame leaving only a small connecting part 148 at each end to support the upper front member 144 and between which connecting parts the top is open, exposing the top part and upper edge surface 150 of a circuit board 160 positioned within the frame. The ends of each frame are open and the parts are of such size and dimensions with respect to each other that each circuit board frame is a high, narrow envelope into which a thin, rectangular circuit board may be inserted from the end of the frame so that it will be supported in vertical position within its frame with its back covered by the back member 140 of the frame, its front face open between the upper and lower front members 146, 148 (although this is not necessary) and its upper edge exposed through the open top.

Each circuit board frame B is connected to and supported by the armatures of one of the pairs of solenoids of the battery A, whereby it will be raised from its normal down position in which it is held by spring 136, to an upper operative position by energization of the solenoid. The battery A may comprise as many frames as desired and there will be one board for each one of a number of names, words or the like which are often repeated, or of which there are a great number in the text, book or the like which is being composed.

In accordance with the invention there are provided a plurality of circuit boards C which are placed in the circuit board frames B. These circuit boards are identical in basic construction, which is most clearly shown in FIG. 4, and each comprises a rectangular, relatively thin sheet of electrical insulating material of such size and dimensions that it may be inserted into one of the circuit board frames B which constitute the circuit board battery A. Each board has the same printed circuit elements on its one surface, which are divided into two groups which are indicated as Group I and Group II in FIG. 4. The printed circuit elements of Group I are a plurality of parallel, un-connected electrically conductive leads which are numbered to correspond to the contacts of the selective rotary switch 30, being numbered from 1 to 40 in FIG. 4 although only twenty fixed contacts are shown in switch 30 in FIG. 1. The printed circuit elements of Group II are a plurality of parallel, un-connected electrically conductive leads which, respectively, correspond to the keys of the keyboard of the tape perforating machine keyboard, and are therefore so designated and marked. Thus, Group II contains printed circuit elements corresponding to each letter of the alphabet, others corresponding to the numerals 0 to 9, others corresponding to the shift and unshift keys, and others corresponding to all other keys of the tape perforating machine keyboard, some of which are shown in FIG. 1 and others of which are listed herein-before in this specification. All of the printed circuit elements of both Group I and Group II are on the front surface of the board and each has a part 162 extending transversely across the upper edge surface of the board, as shown in FIG. 4, so that contact with each element may be made at the upper edge surface of the board and connections between elements may be made at the front surface of the board.

In accordance with the invention certain of the printed circuit elements of Groups I and II of each circuit board are connected so that as the selective rotary switch 30 moves to engage successive fixed contacts of the switch a pre-determined series of keys of the tape perforating machine keyboard will be operated to produce a predetermined sequence of tape perforations which will be those required to operate a typecasting machine to produce the letters of a pre-determined name, word, or sequence of characters. For purposes of illustration of this aspect of the invention reference will be made to the circuit board and frame shown in FIG. 4, and the connection of printed circuit elements to represent the name "Jones" will be described, it being understood that the required tape perforations for this name are: shift, J, unshift, o, n, e, s. Accordingly, the first seven printed circuit elements of Group I of the circuit board, which is the group of elements numbered and positioned to correspond to the leads from the contacts of the selective rotary switch 30, are connected, respectively, to the shift, J, unshift, o, n, e and s printed circuit elements of Group II of the circuit board, which is the group of elements positioned and identified to correspond to the leads from the keys of the keyboard of the tape perforating machine. These connections are shown in FIG. 6 and, respectively, connect the following printed circuit elements of Group I and II:

| | Group I Element | Group II Element |
|---|---|---|
| Lead: | | |
| 170 | 1 | Shift |
| 172 | 2 | J |
| 173 | 3 | Unshift |
| 174 | 4 | o |
| 175 | 5 | n |
| 176 | 6 | e |
| 177 | 7 | s |

It will be understood and obvious that crossed leads are jumped or separated by electrical insulating means so that there will be no electrical connection between them.

As described above, each circuit board frame B is supported on the armatures of two aligned solenoids which rest on the base of the circuit board battery A, and each frame is constructed and adapted to receive one circuit board in upright position as particularly shown in FIG. 3. Means are provided by the invention for selectively raising to operative position any one of the circuit boards of the battery. Such means comprise a number of "name" or "word" keys (or other control device) which are added to, or form part of, the auxiliary keyboard apparatus which includes the operating solenoids for the keys of the tape perforating machine keyboard, some of which solenoids and keys are shown in FIG. 1, and the auxiliary keyboard keys for selectively energizing the solenoids, which auxiliary keyboard is not shown in FIG. 1 but is fully shown and described in the Letters Patent referred to above. Two of these "name" or "word" keys 80, 80*a* are shown in FIG. 1 and it will be understood that these two keys are representative of any number of such keys that may be provided, and each of which represents a name or word which is often repeated, such as the name "Jones" in a telephone directory or "burden of proof" in a legal brief.

Each of the keys 80, 80*a* when operated, connects the contacts of a switch 82, 82*a*, one of which contacts is connected to ground and the other of which is connected to power through the windings of two aligned solenoids of the contact board battery. Thus, the hot contact of switch 82 of FIG. 1 is connected through the windings of solenoids 131, 132 to power at solenoid 132, and when key 80 is depressed to close switch 82 the solenoids 131, 132 will be operated to raise the circuit board frame B and circuit board C which are supported by those solenoids from the lower, inoperative position of the frame and board to their raised, operative position in which those parts of the printed circuit elements of the board which extend across the upper edge of the board are in contact with the leads which extend across the upper part of the circuit board battery. Also, when name key 80*a* is depressed, closing switch 82*a*, solenoids 131*a*, 132*a* will be energized to raise the frame and board supported thereby to their operative position. Depression of either of keys 82, 82*a* will also complete a circuit through relay coil 62 of relay 60, thereby causing operation of motor 50 to move the movable contact 46 of selective rotary switch successively into engagement with the fixed contacts of the switch.

*Operation*

The use and operation of the system and apparatus provided by the invention will now be described, and for the purposes of this description it will be assumed that a telephone directory is to be printed, that punched tape will be used to operate the typecasting machine, and that the directory has 3500 listings of persons named "Jones" and 3800 listings of persons named "Brown," it being understood that these names are only illustrative of the invention and how it is to be used.

In the first place, the electrical system which is partially disclosed in FIG. 1 will be set up and wired. In order to do this each of the contacts of the selective rotary switch 30 will have connected to it a lead which extends across the circuit board battery A so that part of each lead extends between the upper cylindrical supporting members 124, 126 of the battery and is held in place on each of said members by being received within the groove 130 in one of the annular members 138. When all of the contacts of the rotary switch have been provided with such leads the leads from the successive contacts of the switch will extend as Group I in spaced relation in the same succession as the switch contacts across the top of the circuit board battery and will be connected through springs 110 to the connecting rod 108 which extends along that side of the base 120 of the battery which is removed from the rotary switch. The spacing of the leads which extend from the contacts of the rotary switch is the same as the spacing of the parallel printed circuit elements of Group I of the circuit board, as shown in FIG. 2, so that if any circuit board and its frame B is raised from its normal, lower position in which it is below and spaced from the leads, each of the printed circuit parts 162 extending across the upper edge of the raised board will engage the lead directly above it.

The open terminal of each of the operating solenoids for the keys of the keyboard of the tape perforating machine is now provided with a lead which extends to the circuit board battery and across the upper part thereof and between the upper supporting members 124, 126, each of such leads being received within the groove 130 of a pair of annular members 128 which are aligned transversely of the battery. The end of each such lead is connected through a spring 15 to the elongated supporting rod 14 which extends along the side of the base 120 which is removed from the tape perforating machine keyboard, as shown in FIG. 1. The supporting members 128 and therefore the leads from the operating solenoids for the keys of the tape perforating machine are spaced apart along the length of the battery by the same spacing as adjacent printed circuit members of Group II of the circuit board as shown in FIG. 2, so that if any circuit board and its frame B is raised from its normal, lower position in which it is below and spaced from the leads, each of the printed circuit parts 162 extending across the upper edge of the raised board will engage the lead directly above it.

For the purpose of clarity and simplicity the spacing between adjacent leads of Groups I and II in FIGS. 1 and 2 is shown to be greater than the spacing between adjacent printed circuit members of Groups I and II in FIG. 4, but it will be understood that the spacing of the leads is the same as the spacing of the printed circuit elements in order that each of the printed circuit elements of each board will engage a lead when any board is raised.

When the wiring of the system is complete there will, therefore, be a group of leads from the contacts of the rotary switch 30 which are designated as the leads of Group I in FIG. 1, which are of the same number as the printed circuit elements of Group I of each of the circuit boards and parts of each lead extend across the circuit board battery above and in vertical alignment with the parts of the printed circuit elements which extend across the upper edge of each circuit board. There will also be a second group of spaced leads extending across the upper part of the battery which leads are, respectively, connected to the operating solenoids for all of the keys of the tape perforating machine. These leads are designated as the leads of Group II in FIG. 1 and adjacent leads are spaced along the length of the battery by the same spacing as the adjacent printed circuit elements of Group II of each circuit board.

Any number of circuit boards may now be wired, in the manner described above, each for a name or other word which is highly repetitive in the typecasting operation which is being undertaken. Thus, the printed circuit elements of one board may be so wired that successive elements of Group I are connected to elements of Group II to cause operation of the keys of the tape perforating machine keyboard to punch into the tape the successive perforations required to cause the type-casting machine controlled by the tape to cast the letters of the name "Jones," while another board will be wired for the name "Smith," another for a highly repetitive word such as one occurring in a legal brief, and the like.

Any number of "name" keys, such as keys 80 and 80*a* which are shown in FIG. 1, may be mounted on or adjacent the keyboard of the tape perforating machine. Each of such keys may be marked to indicate the name or other word which it represents and the letters of which, on depression of the key, will be punched into the tape with other necessary perforations such as shift and unshift. One contact of the switch associated with each name key is connected to one terminal of the winding of each of a pair of aligned solenoids which support a frame and board assembly. The other terminals of each switch is grounded and the second terminal of each solenoid winding is connected to power, so that operation of any name key will cause the associated pair of solenoids to be energized, raising the frame and board assembly supported thereby to operative position in which all of the printed circuit elements of the board engage all of the leads extending across the upper part of the battery. The first contact of each of the switches controlled by the "name" keys is also connected to the relay coil 62 of the relay 60 so that upon depression of any "name" key the motor 50 is operated to move the movable contact of the rotary switch into successive engagement with the fixed contacts of the switch.

When the circuit boards have been wired they are placed in the circuit board battery, one board to each frame, with each frame and board assembly supported by the upper ends of two aligned solenoids 131, 132. In the normal condition of the battery the solenoids are not energized and all of the circuit boards are in normal position in which their upper edges are spaced below the leads of Groups I and II which extend across the upper part of the battery. Upon depression of any name key, such as key 80, the associated switch 82 will be closed, the two solenoids 131, 132 in circuit therewith will be energized, and the frame and board assembly supported by the solenoid armatures will be raised to operative position in which each of the printed circuit elements of Group I of the board is in electrical contact with one of the leads of Group I of the battery, these being the leads connected to the successive fixed contacts of the rotary switch 30. The printed circuit elements of Group II of the board will also be brought into electrical contact with the leads of Group II of the board, which are the leads connected to the operating solenoids for the keys of the tape perforating machine.

Depression of the name key 80 will also complete the circuit of the relay coil 62 of relay 60, thereby causing operation of the relay and energization of motor 50. The movable contact 46 of rotary switch 30 will therefore move in a counterclockwise direction, as shown in FIG. 1, successively coming in contact with the fixed contacts of the switch and thus successively connecting each lead of Group I to ground at 48.

While all of the printed circuit elements of the activated board will engage a lead of the circuit board battery, only certain pre-determined elements are connected and therefore only those connected elements will be included in completed electrical circuits. Thus, as the movable contact of switch 30 moves successively over contacts 1 to 7, in the example being described, the circuit board connections which have been made, and which are described above, will cause the successive energization of the shift, J, unshift, o, n, e and s keys of the tape perforating machine, thus producing the corresponding characteristic tape perforations. When the rotary contact member of the switch engages fixed contact 8 no further printed circuit elements of the activated board will be brought into circuit as, it will be noted in FIG. 4, element 8 of Group I is not connected to any element of Group II. Thus, after the movable contact leaves the last fixed contact connected to a circuit board element of Group I which is connected to an element of Group II energization of the operating solenoids for the keys of the tape perforating machine ceases. The name key which has been operated is held in depressed position until the tape perforations for the name have been completed, when it is released, causing de-energization of the solenoids which support the activated board in raised, operative position, whereupon the springs 136 which are associated with the solenoids return the frame and board assembly to lowered position.

While I have described and illustrated certain forms which my invention may take, it will be understood that other forms and embodiments may be made and practiced without departing in any way from the spirit or scope of the invention, for the limits of which reference must be made to the appended claim.

What is claimed is:

1. Auxiliary apparatus for operating a selected group of the keys of a tape perforating machine in a pre-determined sequence upon a single operation of a control key thereby to produce a predetermined series of tape perforations such as those required to operate a type-casting machine to cast the letters of a proper name, comprising electrical means associated with each key of the tape perforating machine to operate it when energized, a switch device having a plurality of fixed contacts and a movable contact operable to engage the fixed contacts in sequence when operated, means for operating the movable switch contact, a circuit board battery comprising a base and parallel supporting means mounted thereon, a first group of leads each connected to one of the fixed switch contacts, a second group of leads each connected to one of the electrical key operating means, each lead of the two groups having a part extending between the supporting means on the circuit board battery and all of said parts being arranged in spaced relation along said supporting means, said circuit board battery comprising also a plurality of circuit boards mounted in spaced relation transversely to the spaced parts of the leads and normally out of engagement with said parts, each of said circuit boards having thereon a plurality of electrical connecting means spaced along the length thereof with the same spacing as said lead parts whereby when any circuit board is moved into engagement with the lead parts each of said parts will engage one of the connecting means of the circuit board, certain of the connecting means of each circuit board being connected so that predetermined connecting means of those which engage lead parts of the first group of leads are connected to pre-determined connecting means of those which engage lead parts of the second group of leads in a pre-determined sequence, a plurality of control keys each corresponding to one of said circuit boards, means operable upon depression of any one of said keys for moving the corresponding circuit board into engagement with the lead parts mounted on the circuit board battery whereby certain leads of the first group are connected to certain leads of the second group through the circuit board connections, means operable upon the same depression of the key and simultaneously operable with such movement of the circuit board for operating the movable contact of the switch means, whereby the selected group of keys of the tape perforating machine are operated in the pre-determined sequence.

References Cited

UNITED STATES PATENTS

| | | | |
|---|---|---|---|
| 2,964,743 | 12/1960 | Bange | 234—15 X |
| 3,061,182 | 10/1962 | Corrado et al. | 234—5 |
| 3,113,718 | 12/1963 | Brewer | 234—13 |
| 3,167,244 | 1/1965 | Berlinsky et al. | 234—15 |
| 3,332,617 | 7/1967 | Higonnet et al. | 234—5 |

WILLIAM S. LAWSON, *Primary Examiner.*